(12) United States Patent
Boussemart et al.

(10) Patent No.: US 12,323,221 B2
(45) Date of Patent: Jun. 3, 2025

(54) FLEXIBLE MULTI-MODEM BROADBAND TERMINAL FOR MOBILE PLATFORMS

(71) Applicant: Safran Passenger Innovations, LLC, Brea, CA (US)

(72) Inventors: Vincent Boussemart, Munich (DE); Matteo Berioli, Munich (DE)

(73) Assignee: Safran Passenger Innovations, LLC, Brea, CA (US)

( * ) Notice: Subject to any disclaimer, the term of this patent is extended or adjusted under 35 U.S.C. 154(b) by 0 days.

(21) Appl. No.: 18/005,551

(22) PCT Filed: Oct. 28, 2020

(86) PCT No.: PCT/US2020/070707
§ 371 (c)(1),
(2) Date: Jan. 13, 2023

(87) PCT Pub. No.: WO2022/015362
PCT Pub. Date: Jan. 20, 2022

(65) Prior Publication Data
US 2023/0275653 A1  Aug. 31, 2023

Related U.S. Application Data

(60) Provisional application No. 62/705,790, filed on Jul. 15, 2020.

(51) Int. Cl.
*H04B 7/185* (2006.01)
(52) U.S. Cl.
CPC ..... *H04B 7/18508* (2013.01); *H04B 7/18571* (2013.01); *H04B 7/18578* (2013.01)

(58) Field of Classification Search
CPC ............ H04B 7/18508; H04B 7/18571; H04B 7/18578
See application file for complete search history.

(56) References Cited

U.S. PATENT DOCUMENTS 5,640,424 A  *  6/1997  Banavong ........... H04L 27/2332
375/345
7,873,048 B1 *  1/2011  Kondapalli ............. H04L 47/30
370/392

(Continued)

FOREIGN PATENT DOCUMENTS

CN       104767542 A      7/2015
CN       109314351 A      2/2019

(Continued)

OTHER PUBLICATIONS

European Patent Office, International Search Report and Written Opinion, re PCT/US2020/070707.

(Continued)

*Primary Examiner* — Rasheed Gidado
(74) *Attorney, Agent, or Firm* — Umberg Zipser LLP; Ryan Dean

(57) ABSTRACT

Modular broadband terminals that allow for the connection of a plurality of different modems are provided. The modular broadband terminals include a main connector board having common interfaces. The modems have specific interfaces that may be different from the common interfaces and from others of the modems. Each modem can connect with a converter adapter board that is configured to couple the modem with the common interface.

14 Claims, 2 Drawing Sheets

(56) References Cited

U.S. PATENT DOCUMENTS

| | | | | |
|---|---|---|---|---|
| 2008/0170605 A1* | 7/2008 | Uhlemann | ............ | H04M 11/062 |
| | | | | 375/216 |
| 2012/0069777 A1* | 3/2012 | Saitto | ................. | H04B 7/18536 |
| | | | | 455/12.1 |
| 2015/0195120 A1* | 7/2015 | Miller | ...................... | H04L 69/18 |
| | | | | 375/222 |
| 2018/0375570 A1* | 12/2018 | Lofquist | ............ | H04B 7/18517 |

FOREIGN PATENT DOCUMENTS

| | | | |
|---|---|---|---|
| EP | 2892301 | A1 | 7/2015 |
| EP | 3509167 | A4 | 3/2020 |

OTHER PUBLICATIONS

Vigil A J: "Digital IF for MILSATCOM terminals: CONOPS and standardization for the next decade and beyond", Military Communications Conference, 2010—MILCOM 2010, IEEE, Piscataway, NJ, USA, Oct. 31, 2010 (Oct. 31, 2010), pp. 1128-1133, XP031843677, ISBN: 978-1-4244-8178-1.
Japan Patent Office, Office Action, Sep. 3, 2024.
China Patent Office, Office Action, Mar. 25, 2024.

\* cited by examiner

FLEXIBLE MULTI-MODEM BROADBAND TERMINAL FOR MOBILE PLATFORMS

CROSS-REFERENCE TO RELATED APPLICATIONS

This application claims the benefit of U.S. Provisional Patent Application No. 62/705,790, filed on Jul. 15, 2020. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is broadband terminals.

BACKGROUND

The following description includes information that may be useful in understanding the present invention. It is not an admission that any of the information provided herein is prior art or relevant to the presently claimed invention, or that any publication specifically or implicitly referenced is prior art.

As the demand for Internet connectivity increases continuously, satellite (broadband) terminals are being installed on more and more aircraft and other vehicles. For reception and transmission of data, a satellite modem is typically required. Typically, broadband terminals are limited to a single modem card, which restricts their usage to a specific network system or provider. In this circumstance, to ensure Internet connectivity, the vehicle would be constrained to a specific region of the world and/or a specific satellite system (even if better services become available).

For example, for broadband terminals designed for aircraft, long-distance flights may require a change of satellite systems or dictate that Internet connectivity is not offered during the entire flight. Such broadband terminals are configured according to the ARINC standards 791 and 792 and refers to the Line Replaceable Unit (LRU) designated as the Modem Manager (ModMan). The configuration of the ModMan is currently limited to a single modem per broadband terminal, which results in the ModMan normally permitting connection only to a specific satellite system or constellation.

Thus, in this example, the support of multiple satellite systems requires the use of multiple modems. Generally, this results in using more units that require more space in the aircraft and adding additional weight. Using multiple modems also involve multiple designs and developments, especially with modems offering generally different interfaces (e.g., Ethernet connection, serial interface, etc.). This also can increase costs due to certification and qualification activities.

Another problem is that modem vendors often implement different interfaces on their modem cards. For instance, the number of Ethernet interfaces and also the type of Ethernet interfaces (e.g., 100BASE-T, SGMII) may differ, as well as the number of discrete signal inputs and discrete signal outputs, the LEDs for status indication, and so forth.

In a state-of-the-art implementation, each integration of a new modem card requires a redesign of the printed circuit boards (PCB) in the ModMan into which the modem card is plugged. Even if the modem card is not plugged directly into a PCB but is instead connected via a cable, the PCB of the ModMan must provide the necessary interface to receive the cable connecting the new modem card.

This can require a major redesign of existing ModMan PCBs and ModMan hardware implying excessive cost for engineering efforts and administrative overhead of managing and maintaining dozens of different part number variations.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for a modular broadband terminal that can accommodate multiple different modems without requiring redesign of the PCB or other hardware.

SUMMARY OF THE INVENTION

The inventive subject matter provides apparatus, systems and methods for a modular broadband terminal configured to interface with multiple modems that may have different interfaces. Preferred modular broadband terminals are configured such that different and/or new modems can easily be integrated and supported over time without requiring replacement of the broadband terminal, thereby avoiding a major redesign of the broadband terminal.

As discussed above, a major issue with current broadband terminals is the use of a dedicated modem for each service or provider which has specific interfaces including, for example, specific number of Ethernet interfaces (100BASE-T, SGMII), type of serial connection(s), if any, number of discrete input/output signals, status indicators (e.g. LEDs), and so forth. In this manner, each integration of a new modem card requires a particular configuration of the electronic package to ensure the modem card will properly function.

Contemplated broadband terminals of the inventive subject matter are configured to provide a sufficiently large number of communication interfaces (e.g. Ethernet ports, discrete inputs/outputs, serial communication, status indicators), common to different modems. These interfaces can be accessed via connectors (e.g. mezzanine connectors), which allow for a dedicated printed circuit board (PCB) and/or flexible circuits (e.g. Starrflex) and/or cables to be received/plugged in.

To accommodate different modems, each modem can have a distinct module that can provide a connection/conversion between the common interface of the broadband terminal and the interface of the modem. The module can be a PCB or other component, for example, and is referred to herein as a converter adapter board (CAB). The CAB advantageously permits each modem to be integrated into the broadband terminal and interface correctly with the terminal's electronic package. In addition, the use of an individual CAB per modem can significantly reduce the engineering cost, as no major redesign of the core PCB of the terminal is necessary, while permitting the terminal to adapt to new modem cards.

Utilizing a basic common design for the essential electronic package present in the terminal, connector(s) allowing access to the common interface(s), and circuit(s) ensuring conversion from common to specific interface(s) (e.g., the CAB), advantageously offers sufficient flexibility and adaptability for integrating one or multiple modems in a single terminal. This offers significant benefits over prior art terminals by advantageously by reducing the number of terminals required to use multiple modems and decreasing the costs in terms of design and development, and also, if applicable, in terms of certification and qualification.

The inventive subject matter is further elaborated in the following embodiments.

A modular broadband terminal includes a main connector board having at least two common interfaces; at least one converter adapter board; and at least one modem. In some embodiments, the terminal may include at least two converter adapter boards and at least two modems. At least one of the at least two common interfaces is configured to (a) connect indirectly to one converter adapter board via a flexible circuit or cable or to (b) connect to one converter adapter board by directly receiving the converter adapter board. Each converter adapter board is connected, directly or indirectly, to one modem. The connected modems can be the same or different.

The modular broadband terminal can also include one or more of the following: a main carrier board; a CPU module; a main interface board; and a power supply board. Each of these components can be connected to the connector board of the broadband terminal.

The modular broadband terminal may also include an intermediate frequency (IF) routing circuit, which is configured to communicatively couple with the at least one modem.

Where the modular broadband terminal comprises at least two modems, the IF routing circuit can be configured to switch coax signals from one of the at least two modems to another of the at least two modems. Alternatively, or in addition, the IF routing circuit can be configured to route coax signals through the at least one converter adapter board. The IF routing circuit can also be configured to convert different frequency signals to the same frequency such as for transmission of signals from the broadband terminal.

Another embodiment is directed to a modular broadband terminal that includes a main connector board having at least two common interfaces; a first modem having a first interface that is different from the at least two common interfaces; a second modem having a second interface that is different from the at least two common interfaces and the first interface; a first converter adapter board configured to connect with the first modem and one of the at least two common interfaces; and a second converter adapter board configured to connect with the second modem and another of the at least two common interfaces. Each of the first and second converter adapter boards can be configured to plug directly into one of the at least two common interfaces and the first or second interface or alternatively the boards can be configured to connect to one of the at least two common interfaces via a flexible circuit or cable.

The modular broadband terminal can further include one or more of a main carrier board; a CPU module; a main interface board; and a power supply board. Each of these components can be connected to the main connector board. The connector board may further include an intermediate frequency (IF) routing circuit configured to communicatively couple with the first and second modems. The IF routing circuit can be configured to switch coax signals from one of the first and second modems to the other of the first and second modems. And alternatively, or in addition, the IF routing circuit is configured to route coax signals through one or both of the first and second adapter boards.

In each of the above embodiments, each of the at least two common interfaces of the main connector board is configured to (a) connect indirectly to a converter adapter board via a flexible circuit or cable or to (b) connect directly to a converter adapter board by receiving a converter adapter board.

Various objects, features, aspects and advantages of the inventive subject matter will become more apparent from the following detailed description of preferred embodiments, along with the accompanying drawing figures in which like numerals represent like components.

DETAILED DESCRIPTION

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The modular broadband terminals discussed herein greatly reduce the complications, time delays and costs associated with designing and/or redesigning connector boards and other components so that the terminals can easily accommodate different types of modems. In addition, the ability to have one terminal that can accommodate different types of modem reduces the weight and space required to house these terminals. This last benefit is particularly valuable for terminals that are found on aircraft where space is at a premium.

Satellite specific modems each have specific standards. Every vendor has a proprietary interface and a distinct waveform signal. An aspect of the inventors' discovery is to use a common interface that can work for modems in the present and future.

Figure 1:
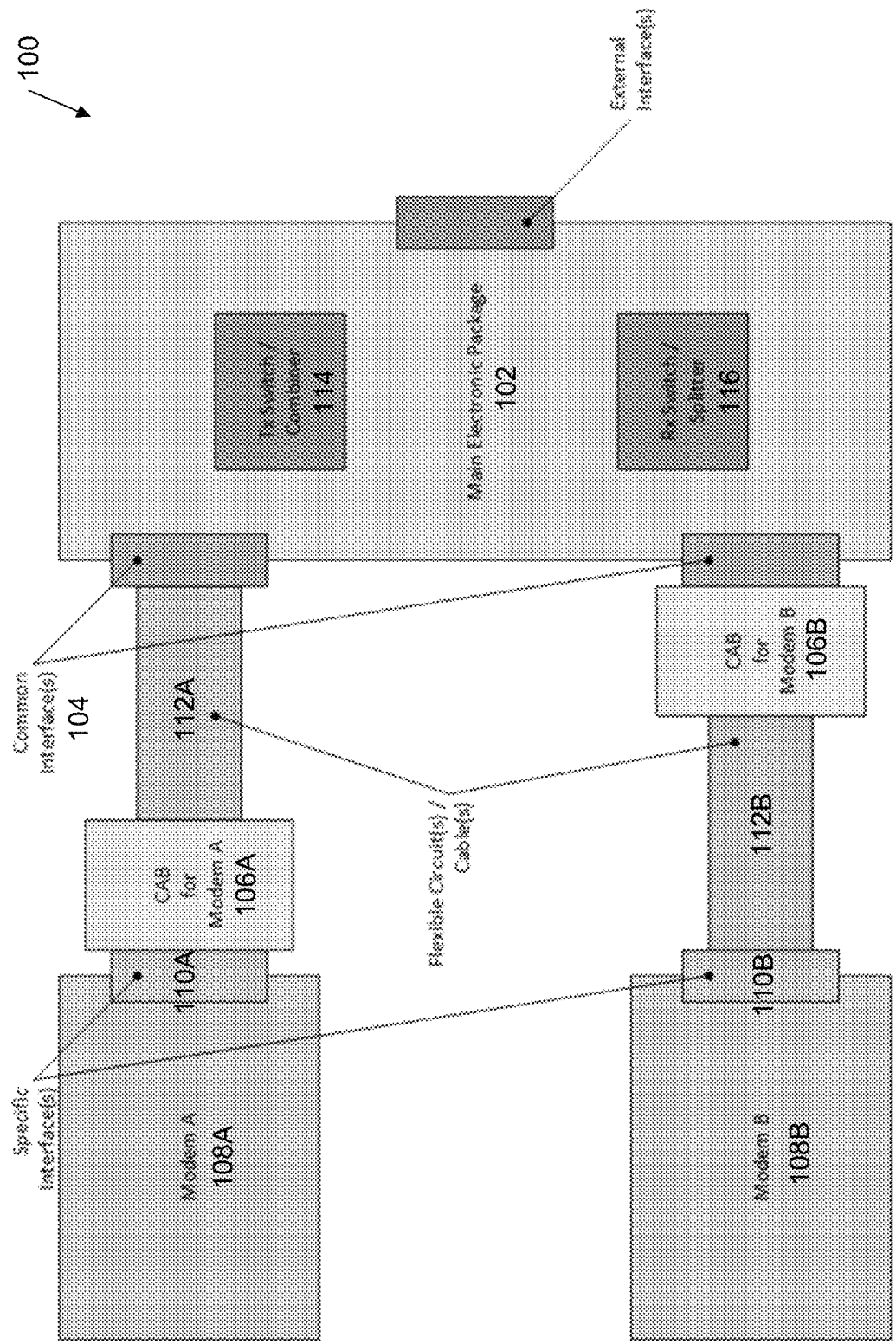
FIG. 1 illustrates a schematic one embodiment of a modular broadband terminal having two modems.

In FIG. 1, a preferred embodiment of a modular broadband terminal 100 is shown comprising a main electronic package 102. The main electronic package 102 comprises one or more common interfaces 104 and preferably at least two common interfaces, to which one or more modems can be coupled. Preferably, the terminal 100 is configured to provide a sufficient number and/or variety of interface(s) for supporting different types of modems. Although two modems are shown coupled to the terminals, it is contemplated that a single modem or three or more modems could be coupled to the terminal without departing from the scope of the invention described herein. They key functionality is the ability to add additional modems and replace modems with newer or different types without having to replace the terminal itself.

The use of multiple modems requires the ability to select/switch between different radio-frequency (RF) transmissions and receive signals (Tx and Rx). This can be realized through a dedicated circuitry switching/combining the Tx paths and/or switching/splitting the Rx signals. To accomplish this, the main electronic package 102 further comprises a transmission (Tx) switch/combiner 114 and/or a receiver (Rx) switch/splitter 116 to ensure transmission and/or receipt from/to modems 108A, 108B, and any other modems. The transmission switch/combiner and receiver switch/splitter can combine the signals for transmission and split the received signals.

A converter/adapter board (CAB) can facilitate the interface between a modem and the main electronic package 102. As shown in FIG. 1, the CAB can either be plugged directly into the modem (i.e., CAB 106A plugged into interface 110A of modem 108A) or directly into the main electronic package 102 (i.e., CAB 106B plugged into interface 104).

CAB 106A can be connected to the common interface 104 via flexible circuit and/or cable 112A. Similarly, CAB 106B can be connected to the interface 110B of modem 108B via flexible circuit and/or cable 112B. In this manner, modem 108B can be connected by cables to CAB 106B, such as in circumstances where modem 108B does not provide one common plug for all signals but individual cables and plugs for different signals (e.g., a dedicated RJ45 plug for each Ethernet connection).

Thus, CABs 106A, 106B can be configured to permit each CAB to be plugged directly to a modem and/or be plugged to cables and/or flexible circuit(s). This allows modularity and adaptability both in terms of electronics/electrical aspects, but also in terms of mechanical attributes (form factor, thermal dissipation, etc.).

CABs 106A, 106B preferably each performs the conversion of signaling, if required (e.g., discrete on/off levels to RS422 voltage levels, TTL conversion to RS232 or RS422, and so forth.). However, CABs 106A, 106B may not be limited to such conversion(s), but could also contain one or more microprocessor(s) for other purposes, such as to adapt certain communication layers.

Figure 2:
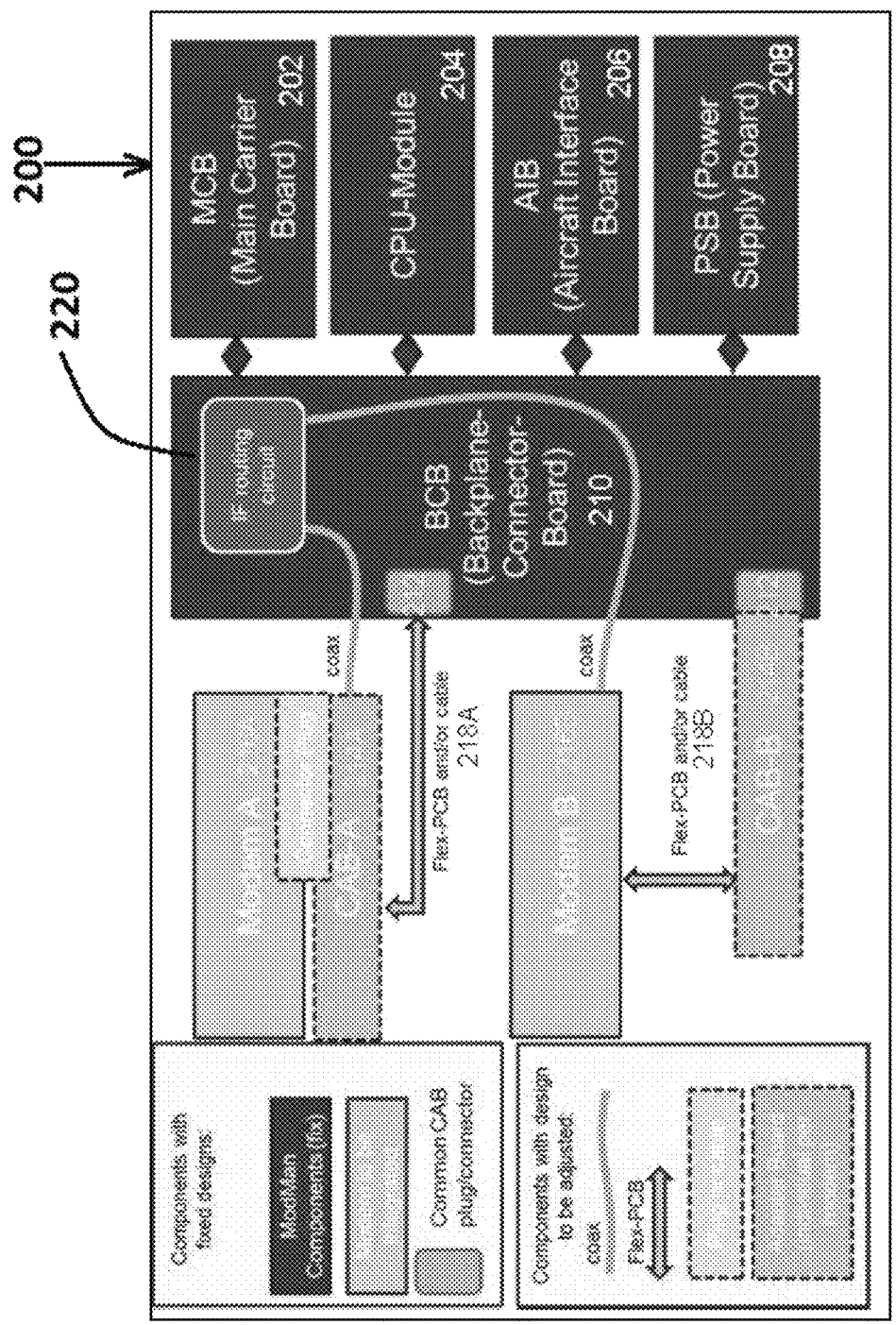
FIG. 2 illustrates a schematic of the modular broadband terminal of FIG. 1 as used in an aircraft.

FIG. 2 illustrates a use-case example in an aircraft based on the terminal of FIG. 1 and shows additionally how the IF signals can be routed, either to the CAB (Modem A) or directly to the modem (Modem B). Although an aircraft is shown, it is contemplated that the systems and methods described herein could be used in trains, boats, busses, and other vehicles.

A modem manager (ModMan) 200 comprises the modem (s) 216A and 216B, and an electronics package having a main carrier board 202, a CPU module 204, a main interface board 206, and a power supply 208. As shown, all of those components can be coupled with a backplane connector board 210. The backplane connector board 210 is contemplated to be an ARINC 600 connector but could depend on the specific application. The backplane connector board 210 advantageously provides an interface with a sufficiently large number of communication interfaces, such as Ethernet ports, discrete inputs, discrete outputs, serial communication interfaces, status indicates, and so forth.

Similar to FIG. 1, each of the modems can utilize a CAB to interface with the ModMan 200 via the common interfaces 212. Again, although two modems are shown coupled to the terminals, it is contemplated that a single modem or three or more modems could be coupled to the terminal without departing from the scope of the invention described herein.

CAB 214A is shown plugged into modem 216A, and the CAB 214A can be connected to the common interface 212 via a flexible circuit and/or cable 218A. CAB 214B is shown plugged into the common interface 212, and the CAB 214B can be connected to the modem 216B via a flexible circuit and/or cable 218B. As discussed above, it is contemplated that each CAB can be distinct to the modem to be integrated. The CAB advantageously allows for interconnecting the modem signals to the communication interfaces provided on the BCB connector. In order to do this, the adaptation of signaling may be required (for instance converting a discrete TTL-Level On/Off signal to RS422 voltage levels, converting between TTL serial communication voltage levels to RS232 or RS422).

In this manner, the space inside ModMan 200 can be used more efficiently and flexibly and the CABs 214A, 214B and/or modems 216A, 216B can be moved away from the BCB 210 by using flexible PCBs or cables 218A, 218B.

Due to the possibility of multiple modems 216A, 216B being connected to the ModMan 200, the backplane connector board 210 can further comprise an "IF routing" circuit 220 to switch coax signals from one modem to the other (e.g., modem 216A to modem 216B, or vice versa). The IF signals can be routed from the modem 216A, 216B via flexible coax cables. However, in other embodiments, the IF signals can be routed through the CAB 214A, 214B, respectively, especially where space optimization is needed.

The inventive subject matter described herein could be also used with modems that are not designed for satellite communications. For example, modems for LTE-based direct Air-to-Ground (ATG) or other systems and waveforms could be utilized so long as the modem uses coax to relay IF signals (rather than RF, high power ones) and a generic interface can be utilized to exchange signaling with the ModMan.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

What is claimed is:

1. A modular broadband terminal, comprising:
a connector board having at least two common interfaces;
a first modem having a first interface that is different from or non-compatible with the at least two common interfaces;
a second modem having a second interface that is different from or non-compatible with the at least two common interfaces and the first interface;
a first converter adapter board separate from the connector board and configured to connect with the first modem and one of the at least two common interfaces; and
a second converter adapter board separate from the connector board and configured to connect with the second modem and another of the at least two common interfaces;
wherein each of the at least two common interfaces is configured to (a) connect indirectly to one of the first and second converter adapter boards via a flexible circuit or cable or to (b) connect to one of the first and second converter adapter boards by directly receiving one of the first converter adapter board or the second converter adapter board;
the first converter adapter board configured to connect with the first modem and one of the at least two common interfaces;
the second converter adapter board configured to connect with the second modem and the other of the at least two common interfaces; and
wherein the connector board further comprises an intermediate frequency (IF) routing circuit, and wherein the IF routing circuit is configured to communicatively couple with the first modem and the second modem and configured to route coax signals through the first converter adapter board and the second converter adapter board, the coax signals being signals transmitted by a coax cable.

2. The modular broadband terminal of claim 1, wherein each of the first and second converter adapter boards is configured to plug directly into one of the at least two common interfaces and the first or second interface.

3. The modular broadband terminal of claim 1, wherein the first converter adapter board is configured to connect to one of the at least two common interfaces via a flexible circuit or cable, and optionally wherein the second converter adapter board is configured to connect to another of the at least two common interfaces via a flexible circuit or cable.

4. The modular broadband terminal of claim 1, wherein the first converter adapter board is configured to connect to the first interface via a flexible circuit or cable.

5. The modular broadband terminal of claim 4, wherein the second converter adapter board is configured to connect to the second interface via a flexible circuit or cable.

6. The modular broadband terminal of claim 1, further comprising:
a main carrier board;
a CPU module;
a main interface board; and
a power supply board,
wherein each of the main carrier board, CPU module, main interface board, and power supply board are connected to the connector board.

7. The modular broadband terminal of claim 1, wherein the IF routing circuit is further configured to switch coax signals from one of the first and second modems to the other of the first and second modems.

8. The modular broadband terminal of claim 1, wherein the IF routing circuit is configured to convert different frequency signals to the same frequency.

9. A modular broadband terminal, comprising:
a connector board having a first common interface and a second common interface, wherein each of the first and second common interfaces is configured to receive a converter adapter board;
a first converter adapter board and a second converter adapter board;
a first modem having a first modem interface that is different from or non-compatible with the first common interface and the second common interface;
a second modem having a second interface that is different from or non-compatible with the first common interface and the second common interface;
wherein one of the first and second common interfaces is configured to be coupled (a) indirectly with the first converter adapter board via a flexible circuit or cable or (b) directly with the first converter adapter board by directly receiving the first converter adapter board;
wherein the other of the first and second common interfaces is configured to be coupled (a) indirectly with the second converter adapter board via a flexible circuit or cable or (b) directly with the second converter adapter board by directly receiving the second converter adapter board; and
wherein the first converter adapter board is connected to the first modem via the first modem interface, and wherein the second converter adapter board is connected to the second modem via the second modem interface;
wherein the connector board further comprises an intermediate frequency (IF) routing circuit, and wherein the IF routing circuit is configured to communicatively couple with the first and second modems and configured to route coax signals through the first and second converter adapter boards, wherein the IF routing circuit is further configured to switch coax signals from one of the first and second modems to the other of the first and second modems.

10. The modular broadband terminal of claim 9, wherein the first modem and the second modem are different.

11. The modular broadband terminal of claim 9, wherein the one of the first and second common interfaces is connected indirectly to the first converter adapter board via the flexible circuit or cable.

12. The modular broadband terminal of claim 9, wherein the one of the first and second common interfaces is connected to the first converter adapter board by directly receiving the first converter adapter board.

13. The modular broadband terminal of claim 9, further comprising:
 a main carrier board;
 a CPU module;
 a main interface board; and
 a power supply board,
 wherein each of the main carrier board, CPU module, main interface board, and power supply board are coupled to the connector board.

14. The modular broadband terminal of claim 9, wherein the IF routing circuit is configured to convert different frequency signals to the same frequency.

* * * * *